May 3, 1938.                    M. C. HATTON                    2,115,926
                    HANDLE FOR INFLATED BALLS AND THE LIKE
                            Filed Aug. 10, 1937
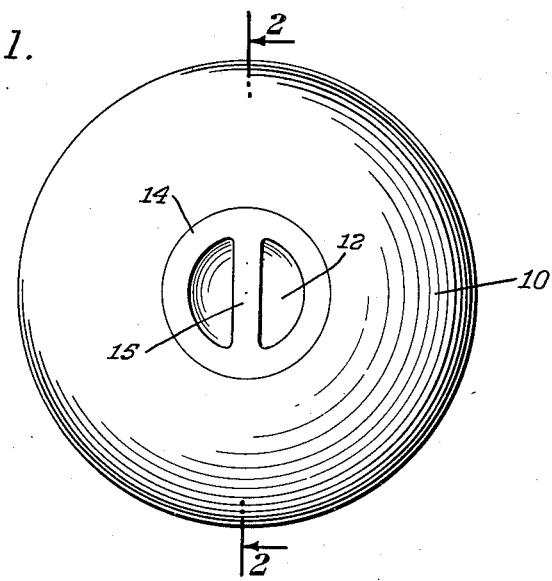
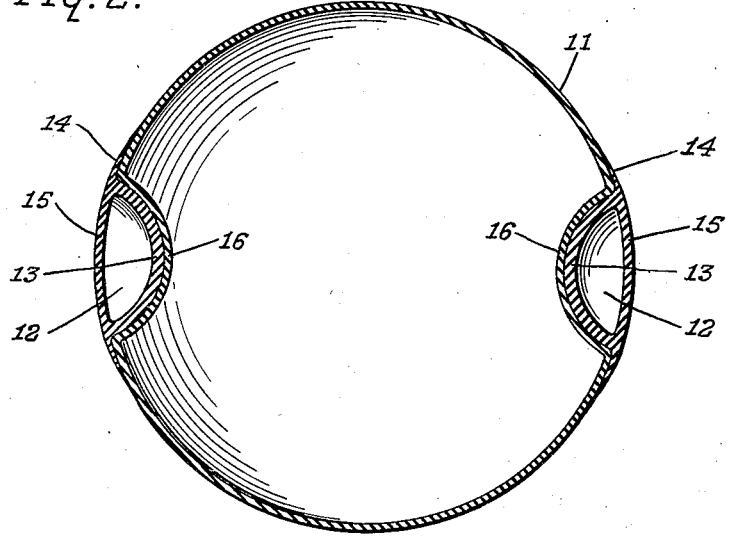
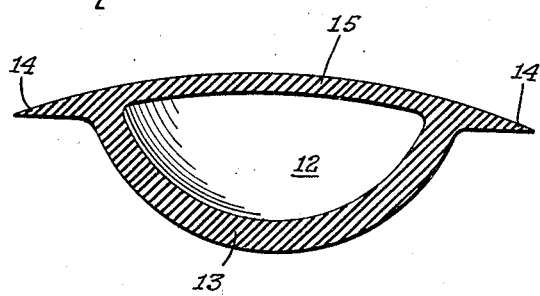
Inventor.
M. C. Hatton
By Hazard and Miller
Attorneys.

Patented May 3, 1938

2,115,926

UNITED STATES PATENT OFFICE 2,115,926

HANDLE FOR INFLATED BALLS AND THE LIKE

Manson C. Hatton, Laguna Beach, Calif.

Application August 10, 1937, Serial No. 158,319

5 Claims. (Cl. 273—58)

This invention relates to handle equipped balls, and particularly to balls of the beach ball type which are made of soft, flexible rubber and which are inflated.

It is customary to provide large inflated balls for amusement purposes, such balls being generally designated as beach balls. While these balls vary in diameter, many prefer large balls of a foot in diameter or larger. When the balls are of large size diameter some difficulty is experienced in handling or carrying the balls.

An object of the present invention is to provide a suitable handle with which balls of this character may be equipped which will facilitate handling or carrying the balls and which is of such design as to preserve the general configuration of the ball so that when the ball is bounced or rolled, in the event that it is bounced on the handle, it will bounce truly without being diverted laterally.

Another object of the invention is to provide an improved ball of the beach ball type which is equipped with handles and which is balanced so that it will roll truly and the presence of the handle will not weight the ball on one side, causing it to roll on a diverted path from that intended.

With the foregoing and other objects in view, which will be made manifest in the following detailed description and specifically pointed out in the appended claims, reference is had to the accompanying drawing for an illustrative embodiment of the invention, wherein:

Figure 1 is a view in side elevation of the improved beach ball illustrating the invention as having been incorporated therein;

Fig. 2 is a diametrical section taken substantially upon the line 2—2 upon Fig. 1; and Fig. 3 is a sectional view through one of the handle-providing members.

Referring to the accompanying drawing wherein similar reference characters designate similar parts throughout, 10 designates a ball having soft, flexible rubber walls generally indicated at 11. The ball preferably is of the inflatable type which may be inflatable through any suitable valve, nipple, or similar construction not shown. While the ball illustrated is spherical in form, it may have any other preferred configuration such as for example a football shape.

The handles for the ball are provided by handle-forming members which provide hemispherical recesses 12. Each handle-forming member is preferably in the form of a circular rubber member having a concavo-convex bottom 13 which may be formed of hard or stiff rubber stock or which may be made of sufficient thickness so that it will be somewhat stiffer than the walls 11 of the ball so as to be capable of retaining it concavo-convex shape against the internal pressure of the ball. The handle-forming members are provided with thin marginal edges 14 which may be formed of soft flexible rubber stock and which are preferably tapered. Extending diametrically across the hemispherical recess 12 is a handle 15 which preferably is formed of soft flexible rubber stock. This handle is arranged so as to be substantially flush with the general configuration surfaces of the ball while the concavo-convex portions of the handle-forming members project inwardly of the general configuration of the ball.

The handle members thus provided may be attached to the ball in any preferred manner such as for example, by vulcanizing or cementing. While apertures may be cut in the walls of the ball to accommodate the concavo-convex members, I prefer to leave the ball uncut and to merely have the portions indicated at 16 stretch over the inner faces of the handle-forming members.

While the ball may be equipped with only a single handle-providing member, I prefer to arrange two handle-providing members on diametrically opposite sides so that the ball will be equally weighted. In this way the ball when rolled will not be overweighted on one side and thus be diverted from the intended path.

It will be noted that both handle-forming members do not project materially beyond the general configuration of the ball and consequently, when the ball is bounced there is no projection on which it may be bounced that will divert it from the true bounce of a normal beach ball. The hemispherical recesses 12 permit the insertion of the fingers beneath the handle 15 by which the ball may be either thrown or carried.

From the above-described construction it will be appreciated that relatively simple, durable handle members are provided which can be easily applied to inflated beach balls and similar constructions. The stiffness of the handle-forming members is sufficient to resist the internal pressure in the ball and preserve recesses at all times beneath the handle so that the fingers may be inserted therein.

While the ball may be equipped with one or more handles a plurality of handles is preferred which may be 2, 3, 4, or more. In all events it is highly preferred to have the handles so spaced on the ball as to leave it balanced about its center. While I have illustrated the device as a separate handle-forming member, to be applied to conventional beach balls now on the market, it will be understood that the construction may be incorporated directly in the construction of the ball and may be made integral therewith.

Various changes may be made in the details of construction without departing from the spirit or scope of the invention as defined by the appended claims.

I claim:

1. In combination with an inflated ball, means providing a recess in the surface of the ball projecting inwardly of the general inflated configuration of the ball, and means providing a handle extending across the recess.

2. In combination with an inflated ball, means providing a recess in the surface of the ball projecting inwardly of the general inflated configuration of the ball, and means providing a handle extending across the recess arranged approximately flush with the inflated configuration of the ball.

3. In combination with an inflated rubber ball, a relatively stiff rubber recess-providing member mounted in the ball so as to project inwardly of the general surface configuration of the ball and a rubber handle bridging the recess.

4. A handle-providing member for inflated balls and the like, comprising a concavo-convex member formed of rubber and which is relatively stiff, said member having flexible rubber marginal edges and having a diametrical handle extending across the concave side thereof.

5. A handle-providing member for inflated balls and the like, comprising a concavo-convex member formed of rubber and which is relatively stiff, said member having flexible rubber marginal edges and having a diametrical handle extending across the concave side thereof, said handle being formed of soft flexible rubber.

M. C. HATTON.